(12) United States Patent
Shiba

(10) Patent No.: US 8,447,978 B2
(45) Date of Patent: May 21, 2013

(54) WIRELESS COMMUNICATION METHOD USING WPS

(75) Inventor: Youichirou Shiba, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 820 days.

(21) Appl. No.: 12/610,467

(22) Filed: Nov. 2, 2009

(65) Prior Publication Data

US 2010/0166186 A1    Jul. 1, 2010

(30) Foreign Application Priority Data

Dec. 26, 2008    (JP) ................. 2008-334881

(51) Int. Cl.
*H04L 9/12* (2006.01)
*H04L 9/08* (2006.01)
(52) U.S. Cl.
USPC ............ 713/169; 713/168; 380/278; 380/283
(58) Field of Classification Search ........................ None
See application file for complete search history.

(56) References Cited

U.S. PATENT DOCUMENTS

2004/0257996 A1    12/2004  Choi et al.
2010/0027414 A1*   2/2010   Hamachi ...................... 370/216

FOREIGN PATENT DOCUMENTS

| JP | 2005-176320 | 6/2005 |
|----|-------------|--------|
| JP | 2006-101416 | 4/2006 |
| JP | 2008-219457 | 9/2008 |
| JP | 2010-041666 | 2/2010 |

OTHER PUBLICATIONS

W-Fi Alliance, Wi-Fi Protected Setup Specification, Version 1.0h, Dec. 2006.
IEEE Computer Society, IEEE Standard for Information Technology—Telecommunications and information exchange between systems—Local and metropolitan area networks—Specific Requirements, Part 11: Wireless LAN Medium Access Control (MAC) and Physical Layer (PHY) Specifications, 2007.
Japanese Office Action for Japanese Application No. 2008-334881 mailed Oct. 9, 2012.

* cited by examiner

*Primary Examiner* — Minh Dinh
(74) *Attorney, Agent, or Firm* — Turocy & Watson, LLP

(57) ABSTRACT

A wireless communication method includes receiving a first frame requesting to start a registration protocol in Wi-Fi protected setup (WPS) of wireless LAN security standards, transmitting, after receiving the first frame, a second frame containing security types and encryption keys for the respective security types, and transmitting a third frame, after transmitting the second frame, the third frame instructing to terminate WPS. The security types include at least one of Wi-Fi protected access (WPA), WPA2 and WEP.

6 Claims, 14 Drawing Sheets

| ID | Size | Element |
|---|---|---|
| 0x1065 | 16Byte | The encryption key of PTK for WPA2-AES.<br>The value is random number generated by AP. |
| 0x1066 | 16Byte | The encryption key of GTK for WPA2-AES.<br>The value is random number generated by AP. |
| 0x1067 | 16Byte | The encryption key of PTK for WPA2-TKIP.<br>The value is random number generated by AP. |
| 0x1068 | 16Byte | The encryption key of GTK for WPA2-TKIP.<br>The value is random number generated by AP. |
| 0x1069 | 16Byte | The encryption key of PTK for WPA-AES.<br>The value is random number generated by AP. |
| 0x106A | 16Byte | The encryption key of GTK for WPA-AES.<br>The value is random number generated by AP. |
| 0x106B | 16Byte | The encryption key of PTK for WPA-TKIP.<br>The value is random number generated by AP. |
| 0x106C | 16Byte | The encryption key of GTK for WPA-TKIP.<br>The value is random number generated by AP. |
| 0x106D | 8Byte | RSC of GTK used for WPA or WPA2. |
| 0x106E | 3Byte | The encryption key of PTK/GTK for WEP(24bit).<br>The value is random number generated by AP. |
| 0x106F | 5Byte | The encryption key of PTK/GTK for WEP(40bit).<br>The value is random number generated by AP. |
| 0x1070 | 13Byte | The encryption key of PTK/GTK for WEP(104bit).<br>The value is random number generated by AP. |

FIG. 6

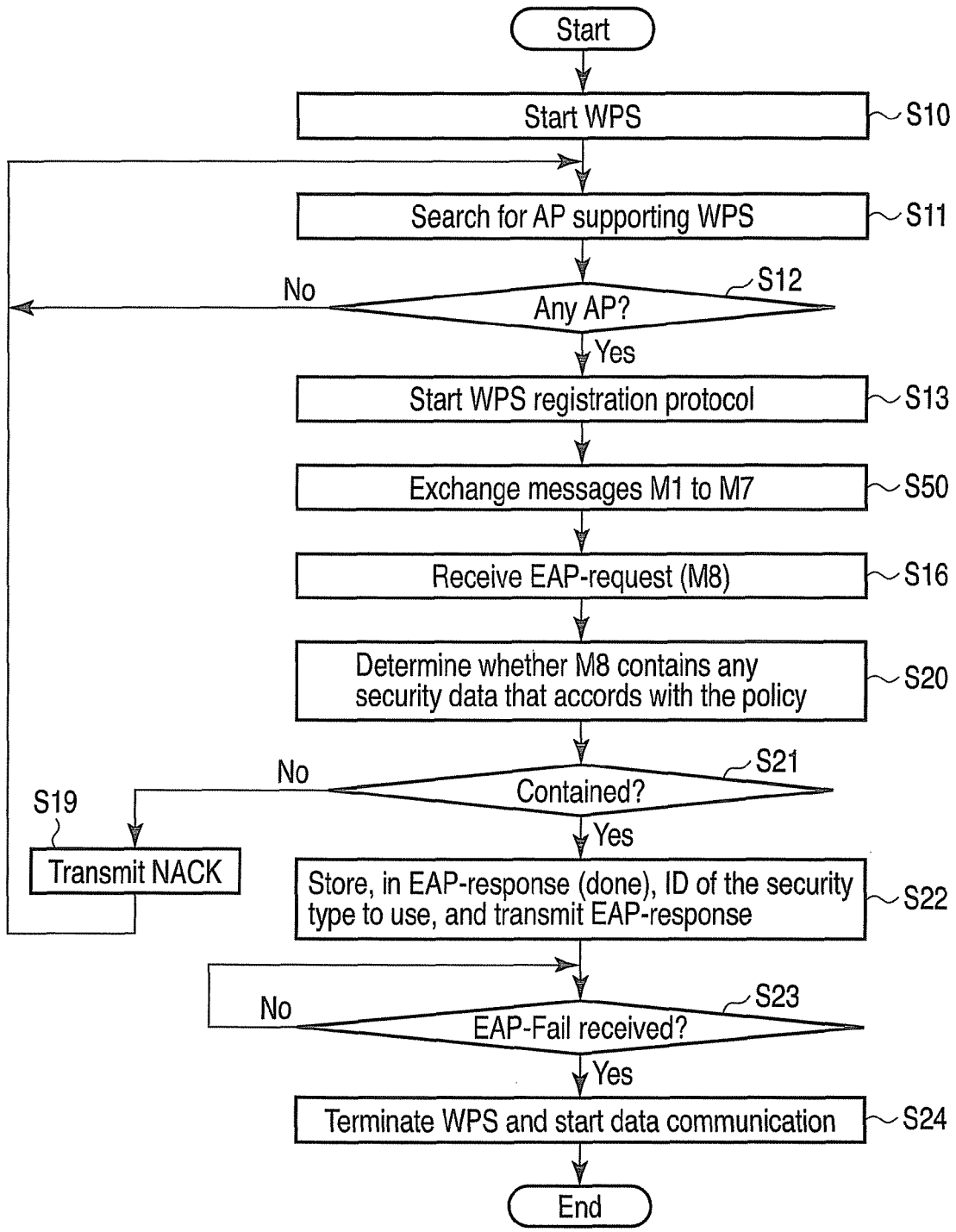
F I G. 12

WIRELESS COMMUNICATION METHOD USING WPS

CROSS-REFERENCE TO RELATED APPLICATIONS

This application is based upon and claims the benefit of priority from prior Japanese Patent Application No. 2008-334881, filed Dec. 26, 2008, the entire contents of which are incorporated herein by reference.

BACKGROUND OF THE INVENTION

1. Field of the Invention

The present invention relates to a wireless communication method. More particularly, the invention relates to a WPS protocol.

2. Description of the Related Art

Wi-Fi protected setup (WPS) is a security-setting protocol for wireless LAN. This protocol has been designed to achieve safe distribution of the security setting to wireless LAN base stations (access points) and wireless LAN terminals (stations). WPS is disclosed in, for example, Wi-Fi Alliance, "Wi-Fi Protected Setup Specification," Version 1.0h, December 2006.

In case where Wi-Fi protected access (WPA) is used for an encryption algorithm, a safe path is prepared first. Then, another safe path is prepared by using WPA again. Using this path, the encryption key is distributed. This technique is disclosed in, for example, IEEE Computer Society, "IEEE Standard for Information technology for Information technology—Telecommunication and information exchange between systems—Local and metropolitan area networks—Specific requirements, Part 11: Wireless LAN Medium Access Control (MAC) and Physical Layer (PHY) Specifications," IEEE Std. 802.11-2007, Revision of IEEE Std. 802.11-1999.

BRIEF SUMMARY OF THE INVENTION

A wireless communication method according to an aspect of the present invention includes:

receiving a first frame requesting to start a registration protocol in Wi-Fi protected setup (WPS) of wireless LAN security standards;

transmitting, after receiving the first frame, a second frame containing security types and encryption keys for the respective security types, the security types including at least one of Wi-Fi protected access (WPA), WPA2 and WEP; and transmitting a third frame, after transmitting the second frame, the third frame instructing to terminate WPS.

BRIEF DESCRIPTION OF THE SEVERAL VIEWS OF THE DRAWING

FIG. 6 is a table showing the security information contained in the message M8 used in WPS according to the first embodiment;

FIG. 12 and FIG. 13 are flowcharts explaining WPS according to a second embodiment of this invention;

DETAILED DESCRIPTION OF THE INVENTION

First Embodiment

Figure 1:
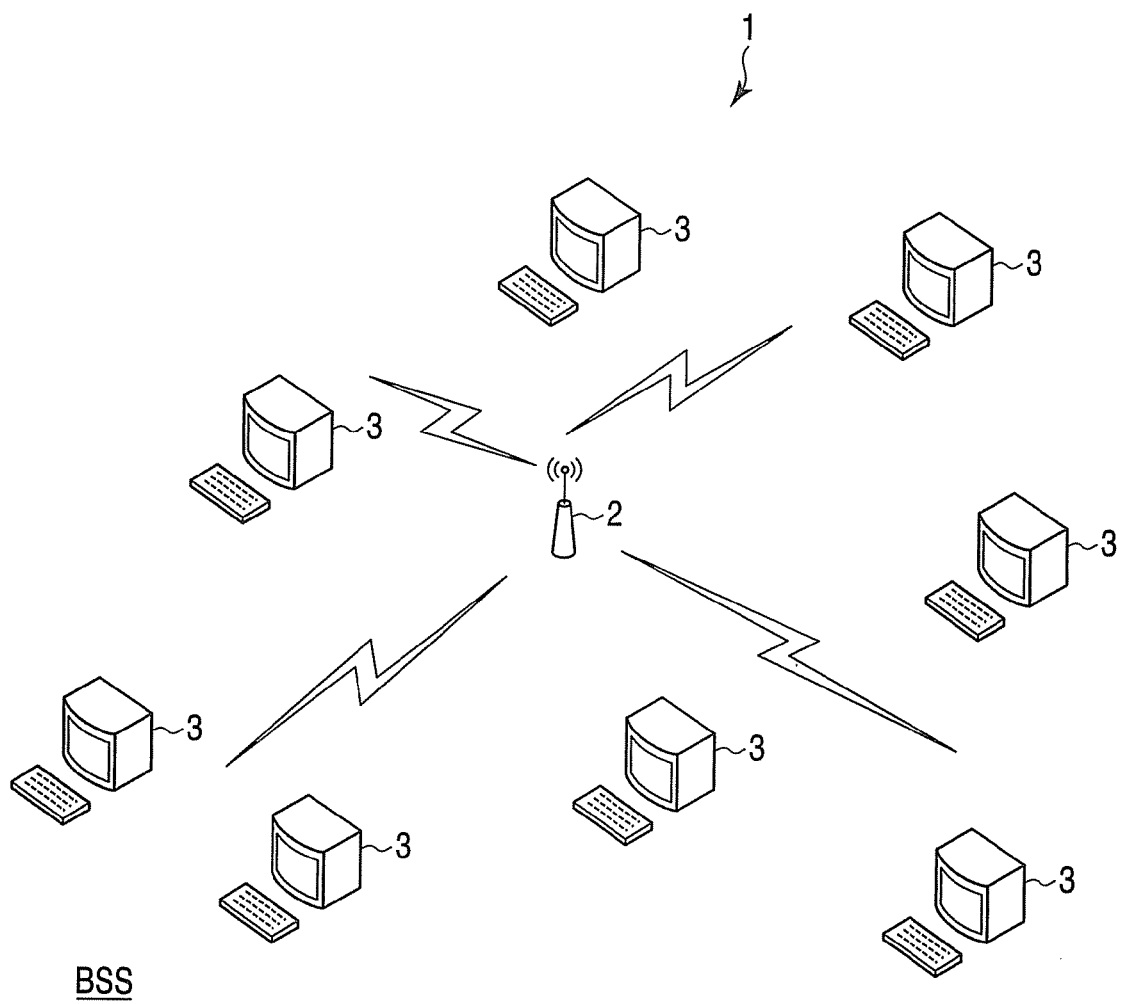
FIG. 1 is a diagram of a wireless LAN system according to a first embodiment of this invention.

A wireless communication method according to a first embodiment of this invention will be described. FIG. 1 is a diagram showing a wireless LAN system according to a first embodiment of this invention.

As FIG. 1 shows, a wireless LAN system 1 includes a wireless LAN base station (hereinafter called "access point") 2 and a plurality of wireless LAN terminals (hereinafter called "stations") 3. The access points 2 and the stations 3 constitute a communication network (i.e., LAN). The stations 3 perform wireless communication with the access point 2, using a frequency band of 20 MHz or 40 MHz. The access point 2 accommodates the stations 3 to form a basic service set (BSS). BBS includes eight stations 3 as shown in FIG. 1. The number of stations included in BBS is not limited, nevertheless.

<Configurations of the Access Point 2 and Stations 3>

Figure 2:
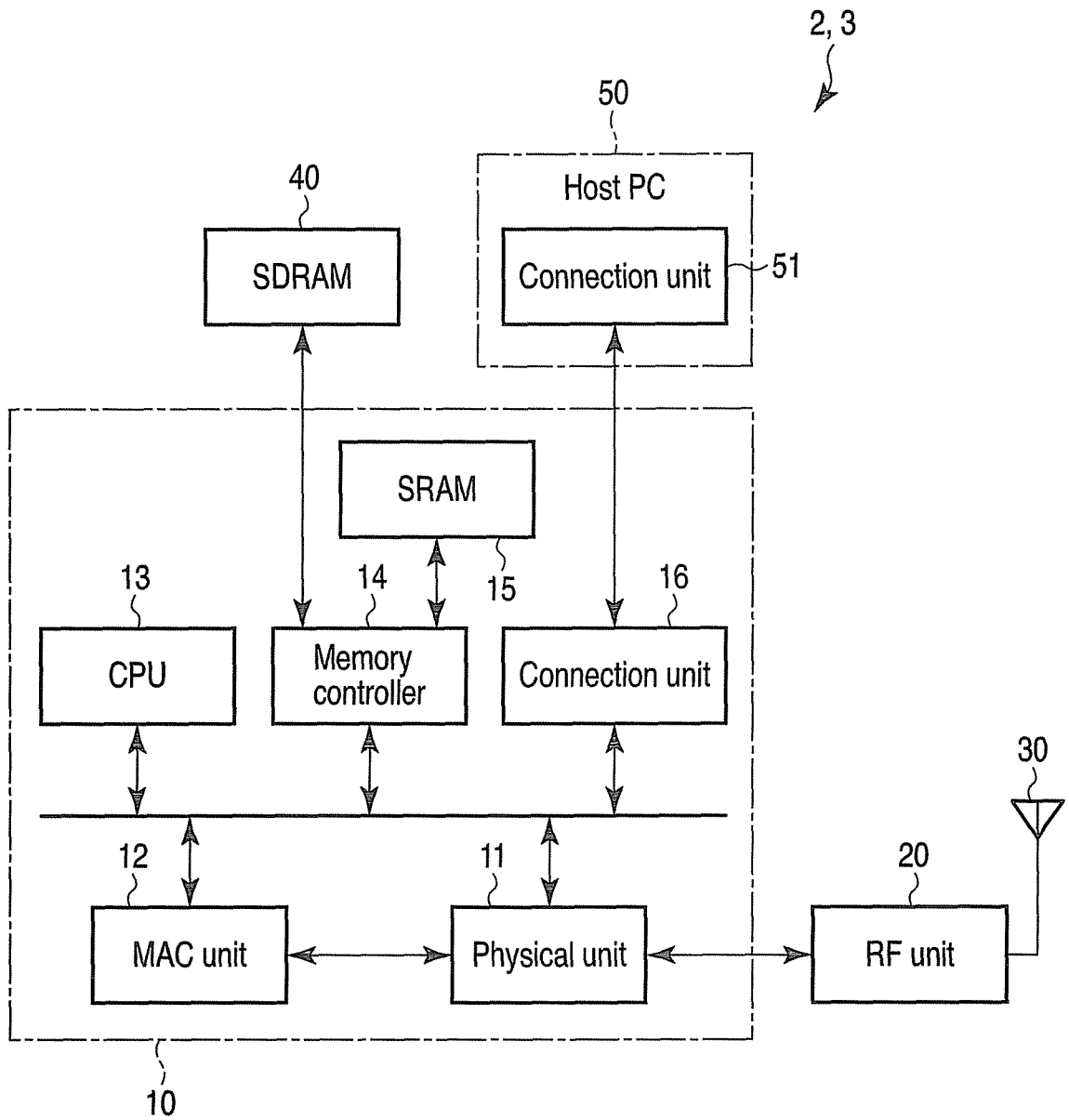
FIG. 2 is a block diagram of an access point and a station, both according to the first embodiment.

The configuration of the access point 2 and the configuration of the stations 3, shown in FIG. 1, will be described with reference to FIG. 2. FIG. 2 is a block diagram showing the access point 2 or stations 3. The access point 2 and the stations 3 are identical in configuration. Therefore, only the configuration of the access point 2 will be described.

As shown in FIG. 2, the access point 2 includes a baseband unit 10, a radio-frequency (RF) unit 20, an antenna 30, a storage device 40, and a host PC 50.

The RF unit 20 can receive and transmit a high-frequency band signal to achieve communication on wireless transmission paths. Further, the RF unit 20 amplifies an analog-data signal that it will transmit or has received. The RF unit 20 transmits and receives the data through the antenna 30. The RF unit 20 is formed on an RF chip, whereas the baseband unit 10 is formed on a baseband chip.

The baseband unit 10 includes a physical unit 11, a medium-access controller (MAC) unit 12, a central processing unit (CPU) 13, a memory controller 14, a storage device 15, and a connection unit 16. These components are formed on the same baseband chip.

The physical unit 11 processes the physical layers of transmission data and reception data. More precisely, on receiving a frame from the RF unit 20, the physical unit 11 performs A/D conversion on the signal received (i.e., analog signal) from the RF unit 20, generating a digital signal. The physical unit 11 then demodulates the digital signal. That is, the physical unit 11 performs, for example, orthogonal frequency-division multiplexing (OFDM) modulation and error correction/decoding, thereby receiving the frame. The frame thus received is output to the MAC unit 12.

On the other hand, to transmit a frame, the physical unit 11 receives the frame from the MAC unit 12. The physical unit 11 then performs redundant encoding and OFDM modulation on the frame received. Further, the physical unit 11 performs D/A conversion on the frame, generating an analog signal. The analog signal is output, as a transmission signal, to the RF unit 20. The RF unit 20 supplies the transmission signal (i.e., frame to transmit) to the antenna 30. The antenna 30 transmits the frame to the stations 3.

The MAC unit 12 processes the MAC layers of the transmission data and reception data. To be more specific, on receiving a frame, the MAC unit 12 receives the frame from the physical unit 11 and removes the MAC header from the reception frame, generating a packet. The "packet" is data so structured to be processed by personal computers and the like. On the other hand, the "frame" is data so structured to be transmitted by means of wireless communication. To transmit a frame, the MAC unit 12 receives a packet from the CPU 13 or host PC 50. The MAC unit 12 adds a MAC header to the packet, generating a transmission frame. The transmission frame thus generated is output to the physical unit 11.

The CPU 13 controls the other components of the baseband unit 10. Further, it processes the transmission data and the reception data. For example, the CPU 13 encrypts the transmission data and outputs the same to the MAC unit 12, and decrypts (decodes) the reception data supplied from the MAC unit 12, thereby generating plain-text data. The plain-text data is stored in the storage devices 15 and 40.

The memory controller 14 controls accesses to the storage devices 15 and 40.

The storage device 15 is a semiconductor memory such as a SRAM. The device 15 can hold the transmission data and the transmission data.

The connection unit 16 is configured to achieve connection between the baseband unit 10 and the host PC 50. In other words, the unit 16 controls the exchange of data and control signals between the baseband unit 10 and the host PC 50.

The storage device 40 is a semiconductor memory such as a synchronous DRAM (SDRAM). The device 40 can hold received data and transmission data. The storage device 40 can, of course, be a device such as a hard disk drive.

The host PC 50 has a connection unit 51. The connection unit 51 connects the host PC 50 to the connection unit 16 of the baseband unit 10. In other words, the unit 51 controls the exchange of data and control signals between the baseband unit 10 and the host PC 50. The host PC 50 generates transmission data that should be transmitted to the stations 3 (see FIG. 1). The transmission data is supplied via the connection unit 16 and memory controller 14 to the storage devices 15 and 40 and is held in the storage devices 15 and 40. Further, the host PC 50 reads reception data from the storage devices 15 and 40, respectively, through the memory controller 14 and connection unit 16 and processes using the reception data. Note that the transmission data and the reception data may be encrypted and decrypted, respectively, by the host PC 50, instead of by the CPU 13.

<Operations of the Access Point 2 and Stations 3>

How the access point 2 and the station 3 operate in the present embodiment will be explained, particularly in connection with WPS. Note that the CPU 13 or the MAC unit 12 generates signals (packets) and analyzes the content of each signal (packet).

<Operation of the Stations 3>

Figure 3:
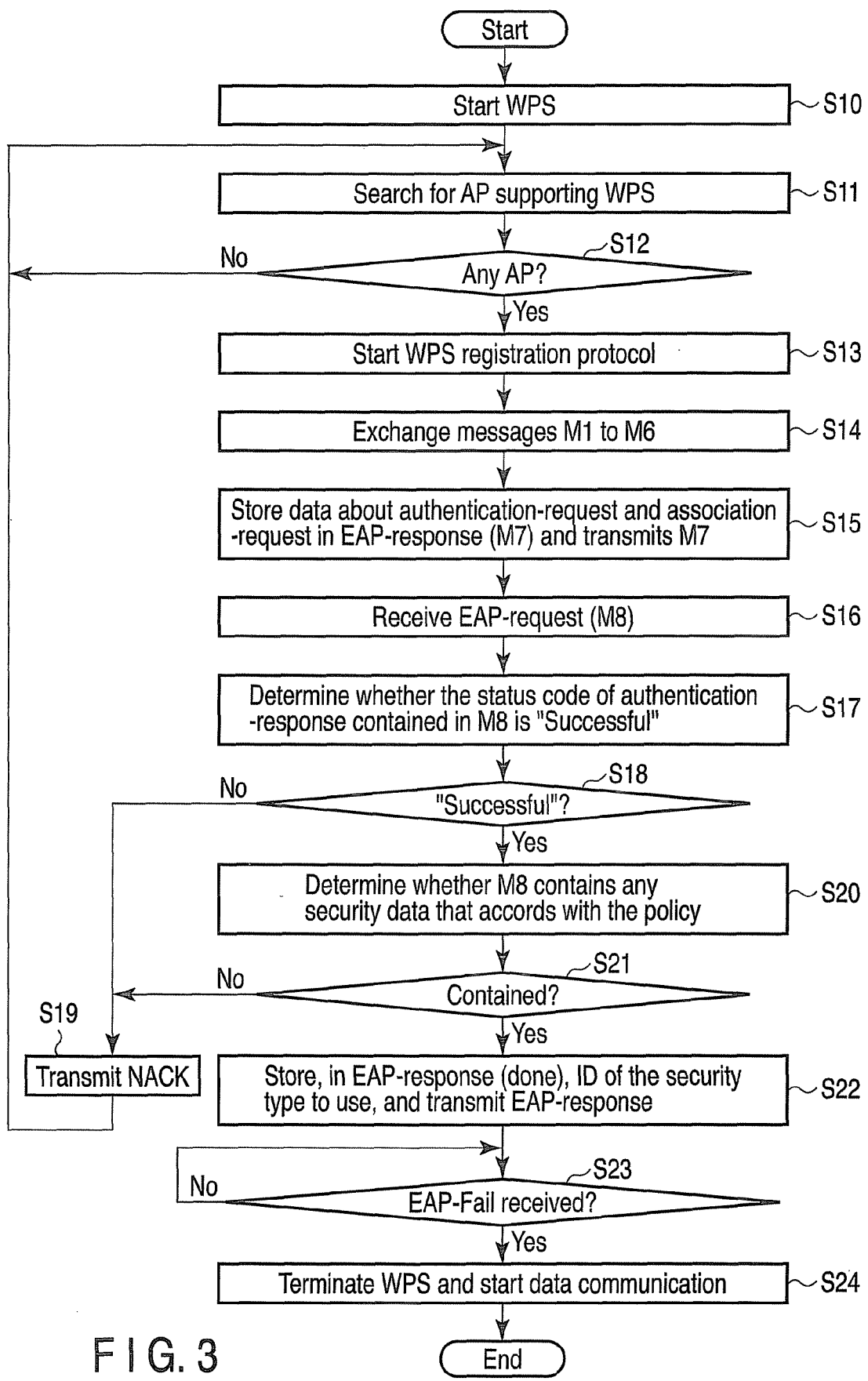
FIG. 3 is a flowchart of WPS, according to the first embodiment.

First, how each station 3 operates will be explained with reference to FIG. 3. FIG. 3 is a flowchart explaining how the station 3 operates in accordance with WPS.

The station 3 starts performing WPS (Step S10). First, the station 3 searches for an access point that supports WPS (Step S11). On finding the access point 2 (if YES in Step S12), the station 3 starts executing a WPS registration protocol (Step S13).

More specifically, the station 3 transmits an EAPOL (EAP over LAN)-Start frame, an EAP (extensible authentication protocol)-response/identify frame, and the like, to the access point 2, in accordance with the WPS standards. The station 3 then exchanges WPS-defined messages M1 to M6 with the access point 2, by using an EAP-request and an EAP-response (Step S14).

After receiving the message M6, the station 3 stores the data about an authentication-request and an association-request in an EAP-response frame that is a message M7, and then transmits the message M7 to the access point 2 (Step S15). The message M7 has such a frame format as shown in FIG. 4.

Figure 4:
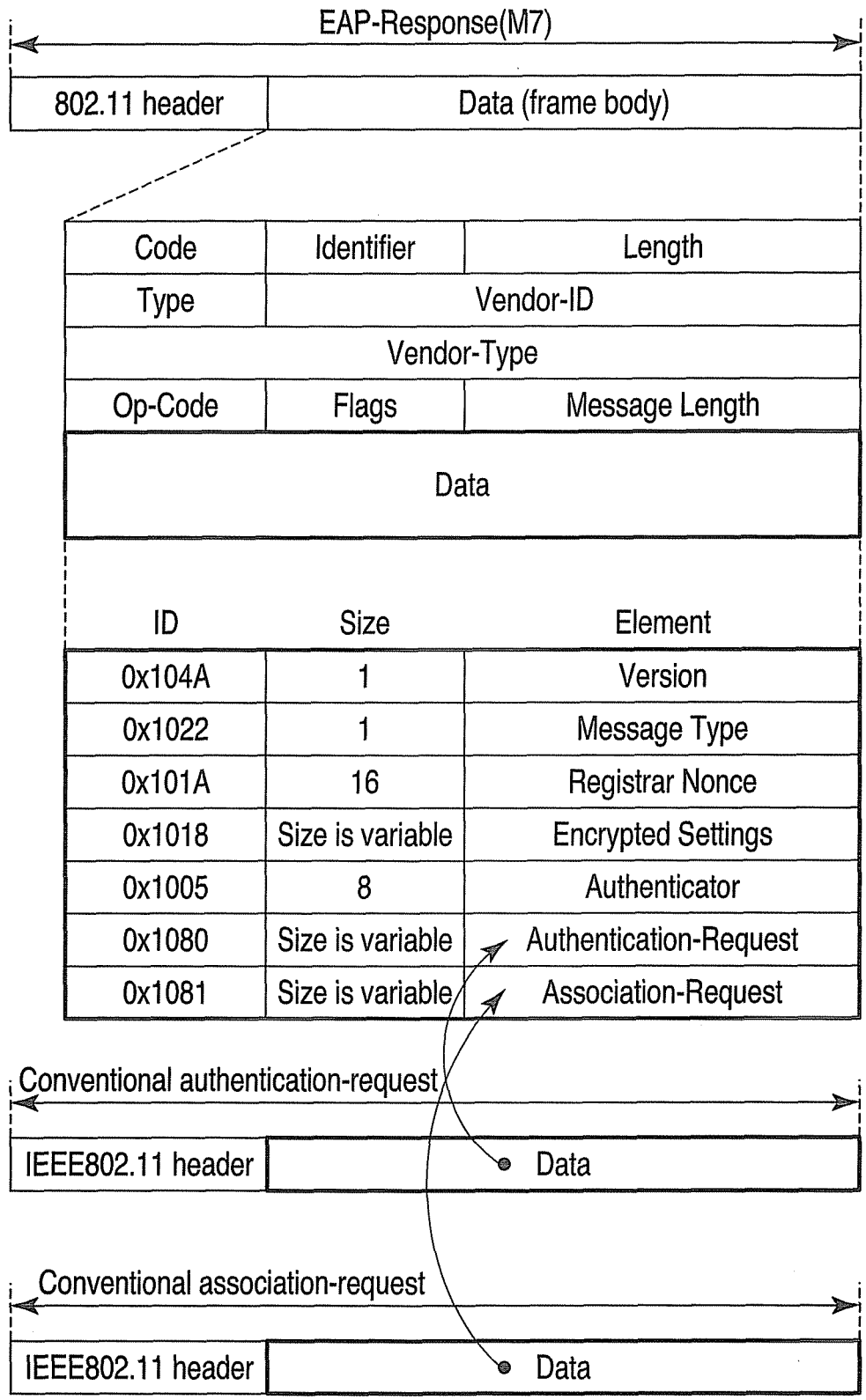
FIG. 4 and FIG. 5 show the frame formats of messages M7 and M8 used in WPS according to the first embodiment, respectively.

As FIG. 4 shows, the message M7 includes data (frame body) and an IEEE 802.11 header. The header precedes the frame body. The frame body contains code, identifier, length, type, vendor-ID, vendor-type, op-code, flags, message length, and data field. This configuration of the message M7 accords with the WPS standards. The EAP-response frame and the EAP-request frame other than the message M7 have the same configuration as the message M7. These messages differ from one another in terms of the data-field content.

The data field of the message M7 contains an authentication-request and an association-request, in addition to data items of version, message type, registrar nonce, encrypted settings and authenticator. These data components, their IDs and their sizes (number of bytes) are stored in a data frame. In the instance of FIG. 4, IDs "0x104A," "0x1022," "0x101A," "0x1018," "0x1005," "0x1080" and "0x1081" are allocated to the version, message type, registrar nonce, encrypted settings, authenticator, authentication-request and association-request, respectively. Note that "0x" shows that the following numerical value is hexadecimal. The size is written next to ID. For example, the size of version is 1 byte. The receiver side that receives the message M7 can therefore recognize the 1-byte data following the size data represents "version," upon detecting ID="0x104A."

The message M7 contains version, message type, registrar nonce, encrypted settings and authenticator, in accordance with the WPS standards. In the present embodiment, the message M7 further contains an authentication-request and an association-request. The authentication-request and the association-request are management data items that accord with the IEEE 802.11 standards. More precisely, they correspond to the body of IEEE 802.11 authentication-request frame and the body of IEEE 802.11 association-request frame, respectively. The station 3 puts a WPA information element (IE) in the association-request. WPA IE is data that shows that the station 3 supports WPA and contains a data item representing the encryption scheme to be used in the station 3.

Figure 5:
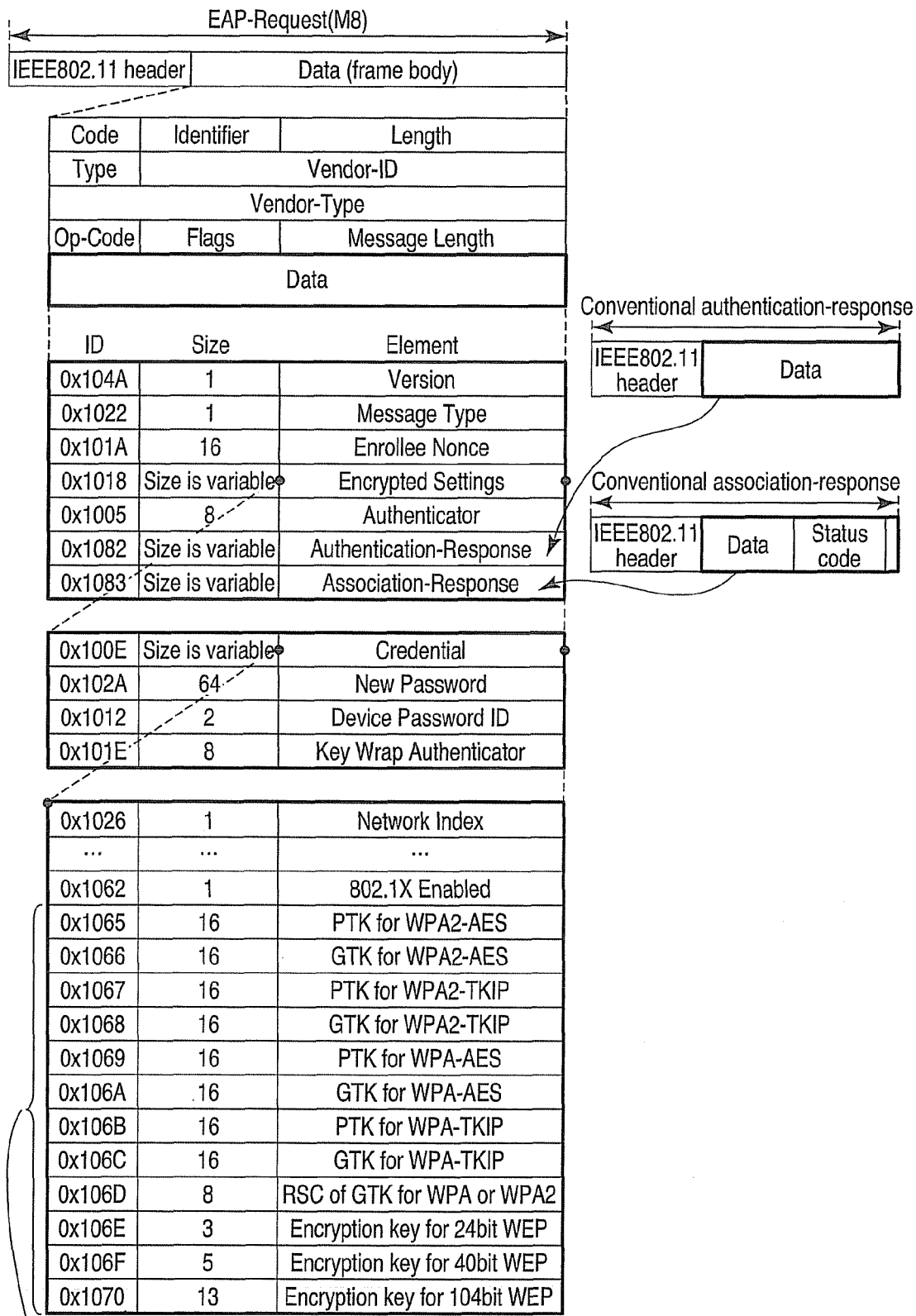

Next, the station 3 receives an EAP-request frame, as message M8, from the access point 2 (Step S16). Message M8 has such a frame format as shown in FIG. 5. As FIG. 5 shows, the data field of the message M8 contains an authentication-response and an association-response, in addition to data components of version, message type, enrollee nonce, encrypted settings and authenticator. As in the message M7, the ID, size and content of each of these data component are stored in a data field.

Of the data components mentioned above, version, message type, enrollee nonce, encrypted settings and authenticator are contained in the message M8 as is defined in the WPS standards. In the present embodiment, the message M8 contains, in addition to these items, the authentication-response and association-response. The authentication-response and the association-response are management data items that accord with the IEEE 802.11 standards. They correspond to the body of IEEE 802.11 authentication-request frame and the body of IEEE 802.11 association-request, respectively. The association-response contains a status code field. In this field, "Successful" is stored if the access point 2 supports WPA, and any other value is stored if the access point 2 does not support WPA. This point accords with the IEEE 802.11 standards, too.

In compliance with the WPS standards, the encrypted settings field of the message M8 contains data items such as credential, new password, device password ID and key wrap authenticator. Of these data items, credential contains not only WPS-defined data, but also security data for used in data communication. More specifically, the security data represents an encryption scheme and the encryption key to be used in this scheme. This encryption scheme is a scheme supported by the access point 2 and requested by the station 3 in the WPA IE of the association-request contained in the message M7.

FIG. 5 shows the frame format that the message M8 has when WPA2-advanced encryption standards (AES), WPA2-temporal key integrity protocol (TKIP), WPA-AES, WPA-TKIP and wired equivalent privacy (WEP) are supported as encryption schemes. That is, credential contains the IDs of encryption schemes the access point 2 can use, the encryption keys of the respective encryption schemes, and the data sizes of these encryption keys. The content of credential will be described with reference to FIG. 6. FIG. 6 is a table showing the encryption schemes and encryption keys, contained in credential of the message M8.

As shown in FIG. 6, ID="0x1065" means that WPA2-AES is used as the encryption scheme, and the pairwise transient key (PTK) for WPA2-AES is stored immediately after the size data. ID="0x1066" means that WPA2-AES is used as the encryption scheme, and the group temporal key (GTK) for WPA2-AES is stored immediately after the size data. The use of PTK means that the frame is transmitted as a unicast frame. The use of GTK means that the frame is transmitted as a broadcast frame. ID="0x1067" means that WPA2-TKIP is used as the encryption scheme, and the PTK encryption key for WPA2-TKIP is stored immediately after the size data. ID="0x1068" means that WPA2-TKIP is used as the encryption scheme, and the GTK encryption key for WPA2-TKIP is stored immediately after the size data. ID="0x1069" means that WPA-AES is used as the encryption scheme, and the PTK encryption key for WPA-AES is stored immediately after the size data. ID="0x106A" means that WPA-AES is used as the encryption scheme, and the GTK encryption key for WPA-AES is stored immediately after the size data. ID="0x106B" means that WPA-TKIP is used as the encryption scheme, and the PTK encryption key for WPA-TKIP is stored immediately after the size data. ID="0x106C" means that WPA-TKIP is used as the encryption scheme, and the GTK encryption key for WPA-TKIP is stored immediately after the size data. The initial receive sequence counter (RSC) number of GTK, for WPA or WPA2, is stored immediately after ID="0x106D." IDs="0x106E," "0x106E," and "0x106E" mean that WEP (24 bits), WEP (40 bits), and WEP (104 bits) are used as the encryption scheme, respectively. The PTK encryption key and GTK encryption key, both for WEP, are stored immediately after the size data.

The message M8 may, of course, contain all IDs mentioned above in some cases, and may contain only some of these IDs in other cases. How many IDs are contained in the message M8 depends on how many encryption schemes the station 3 supports and on how many encryption schemes the access point 2 supports.

Next, the station 3 determines whether the status-code field of the authentication-response of the message M8 is "Successful" (Steps S17 and S18). If the status-code field is not "Successful" (if NO in Step S18), the station 3 transmits the EAP-response frame, as NACK, back to the access point 2 (Step S19). The operation then returns to Step S11.

Figure 7:
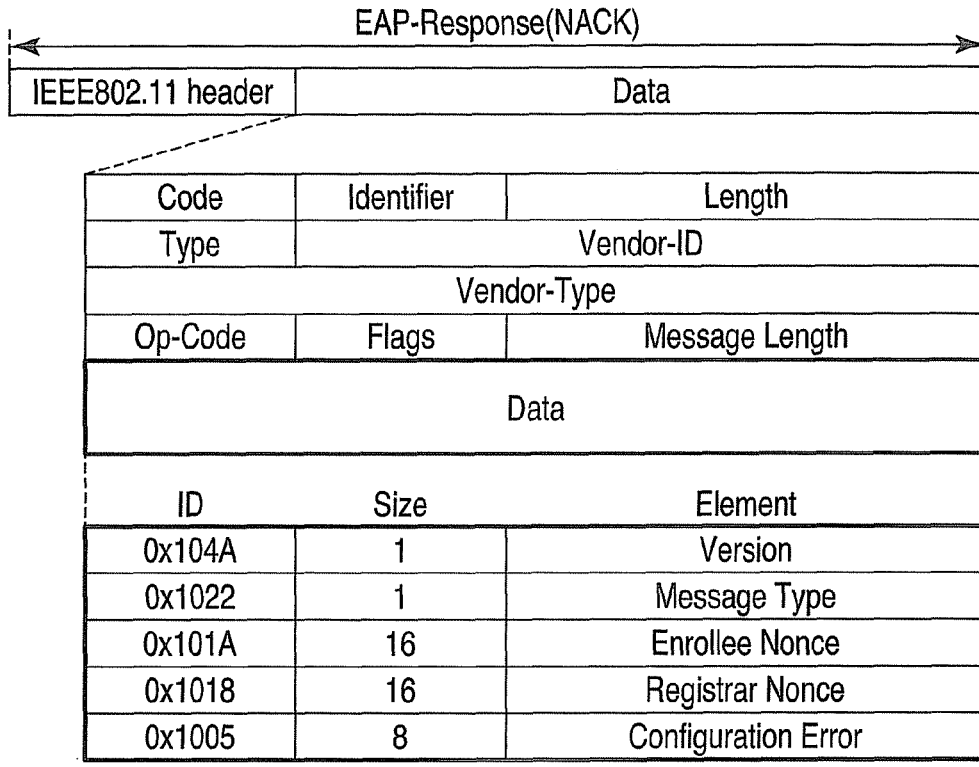
FIG. 7 and FIG. 8 show the frame formats of the EAP-response (NACK) and EAP-response (done) used in WPS according to the first embodiment, respectively.

The EAP-response (NACK) has such a frame format as shown in FIG. 7. As FIG. 7 shows, the data field of NACK contains data items that represent version, message type, enrollee nonce, registrar nonce, and configuration error. The format of NACK accords with the WPS regulations.

If the status-code field is not "Successful" (if YES in Step S18), the station 3 determines whether the message M8 contains security data that accords with its policy (Step S20). If none of security data in the message M8 accords with the policy of the station 3 (if NO in Step S21), the station 3 executes the process in Step S19. If any security data in the message M8 accords with the policy of the station 3 (if YES in Step S21), the station 3 stores the ID of the security type that should be used, in the EAP-response (done). Then, the station 3 transmits the EAP-response, now containing the security type ID, to the access point 2 (Step S22).

Figure 8:
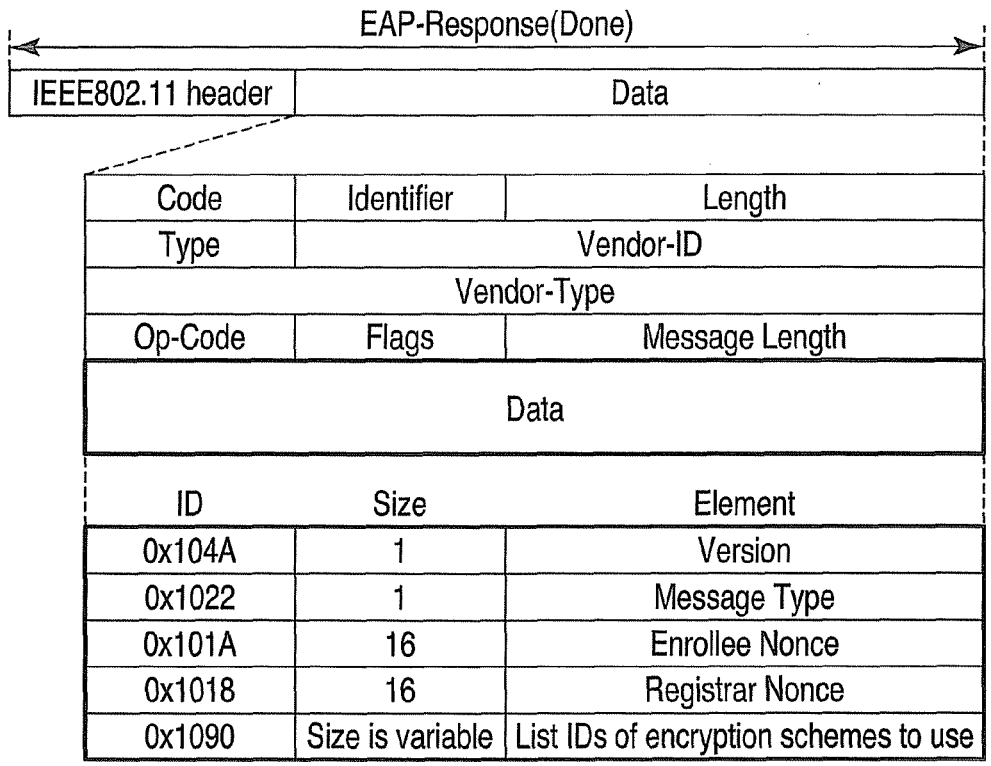

The EAP-response (done) has such a frame format as shown in FIG. 8. As FIG. 8 shows, the data field contains the ID of the encryption scheme to be used, in addition to version, message type, enrollee nonce and registrar nonce that accord with the WPS regulations. The station 3 may want to use a plurality of encryption schemes. In this case, IDs of these encryption schemes are listed in the data field.

Thereafter, the station 3 determines whether EAP-Fail has been received (Step S23). If EAP-Fail has been received (if YES in Step S23), the station 3 terminates WPS and starts data communication with the access point 2 (Step S24).

<Operation of the Access Point 2>

Figure 9:
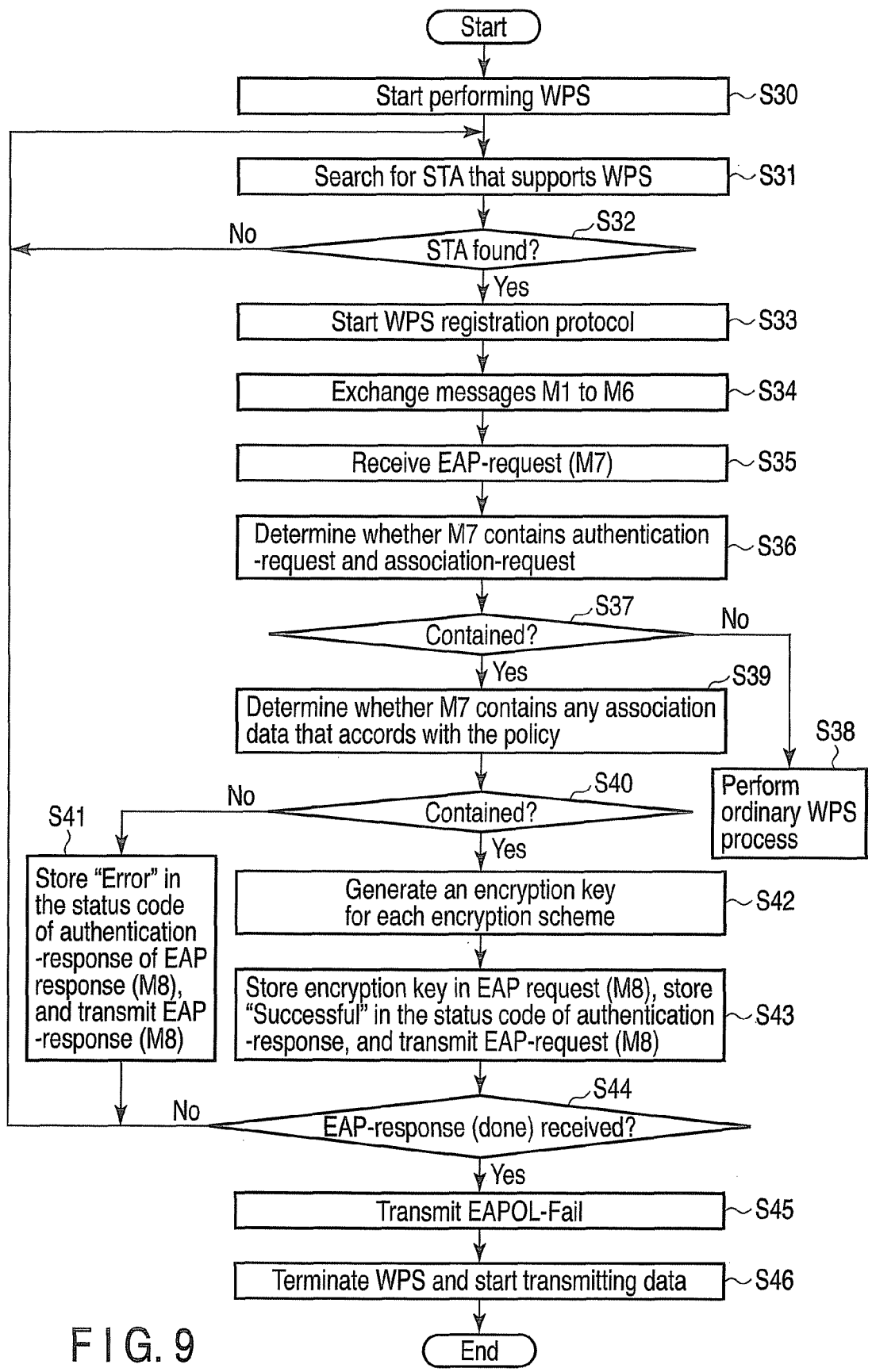
FIG. 9 is a flowchart explaining WPS according to the first embodiment.

How the access point 2 operates will be explained with reference to FIG. 9. FIG. 9 is a flowchart explaining how the access point 2 operates in accordance with WPS.

The access point 2 starts performing WPS (Step S30). First, the access point 2 searches for a station 3 that supports WPS (Step S31). On finding such a station 3 (if YES in Step S32), the access point 2 starts performing a WPS registration protocol (Step S33).

That is, the access point 2 starts performing the WPS registration protocol upon receiving an EAPOL-start frame, and transmits an EAP-request/identify frame, etc. to the station 3. Then, using an EAP-request frame and an EAP-response frame, the access point 2 exchanges the messages M1 to M6 that accord with WPS, with the station 3 (Step S34).

The access point 2 then receives the message M7 (Step S35). Message M7 is so configured as explained with reference to FIG. 4. The access point 2 determines whether the data field of the message M7 contains an authentication-request and an association-request (Step S36). More precisely, the access point 2 determines whether the data field contains ID="0x1080" and ID="0x1081."

If the data field does not contain an authentication-request or an association-request (if NO in Step S37), the access point 2 performs WPS as hitherto been practiced (Step S38). If the data field contains an authentication-request and an association-request (if YES in Step S37), the access point 2 determines whether the message M7 contains association data that accords with its policy (Step S39). This process is achieved by finding WPA IE contained in the association-request. That is, WPA IE contains data about the encryption scheme the station 3 desires to use. Hence, the access point 2 can determine whether it can support the encryption scheme the station 3 desires to use, merely by referring to WPA IE.

If the message M7 contains no association data that accords with its policy (if NO in Step S40), that is, if the access point 2 cannot support the encryption scheme the station 3 desires to use, the access point 2 stores "Error" in the status code of the authentication-response contained in the message M8. Then, the access point 2 transmits the message M8, now containing "Error," to the station 3 (Step S41). Message M8 is so configured as explained with reference to FIG. 5. Message M7 may contain association data that accords with its policy (that is, YES in Step S40), and access point 2 may therefore support any encryption scheme the station 3 desires to use. If this is the case, the access point 2 generates an encryption key for each encryption scheme it can support (Step S42). Then, the access point 2 stores "Successful" in the status code of the authentication-response contained in the message M8, and the ID of the encryption scheme it can support and the encryption key in credential. Then, the access point 2 transmits the message M8, containing the authentication-response and credential, to the station 3 (Step S43).

Thereafter, on receiving the EAP-response (done) (that is, YES in Step S44), the access point 2 transmits an EAP-fail frame to the station 3 (Step S45). The access point 2 then terminates WPS and starts data communication (Step S46).

<Specific Example of WPS>

Figure 10:
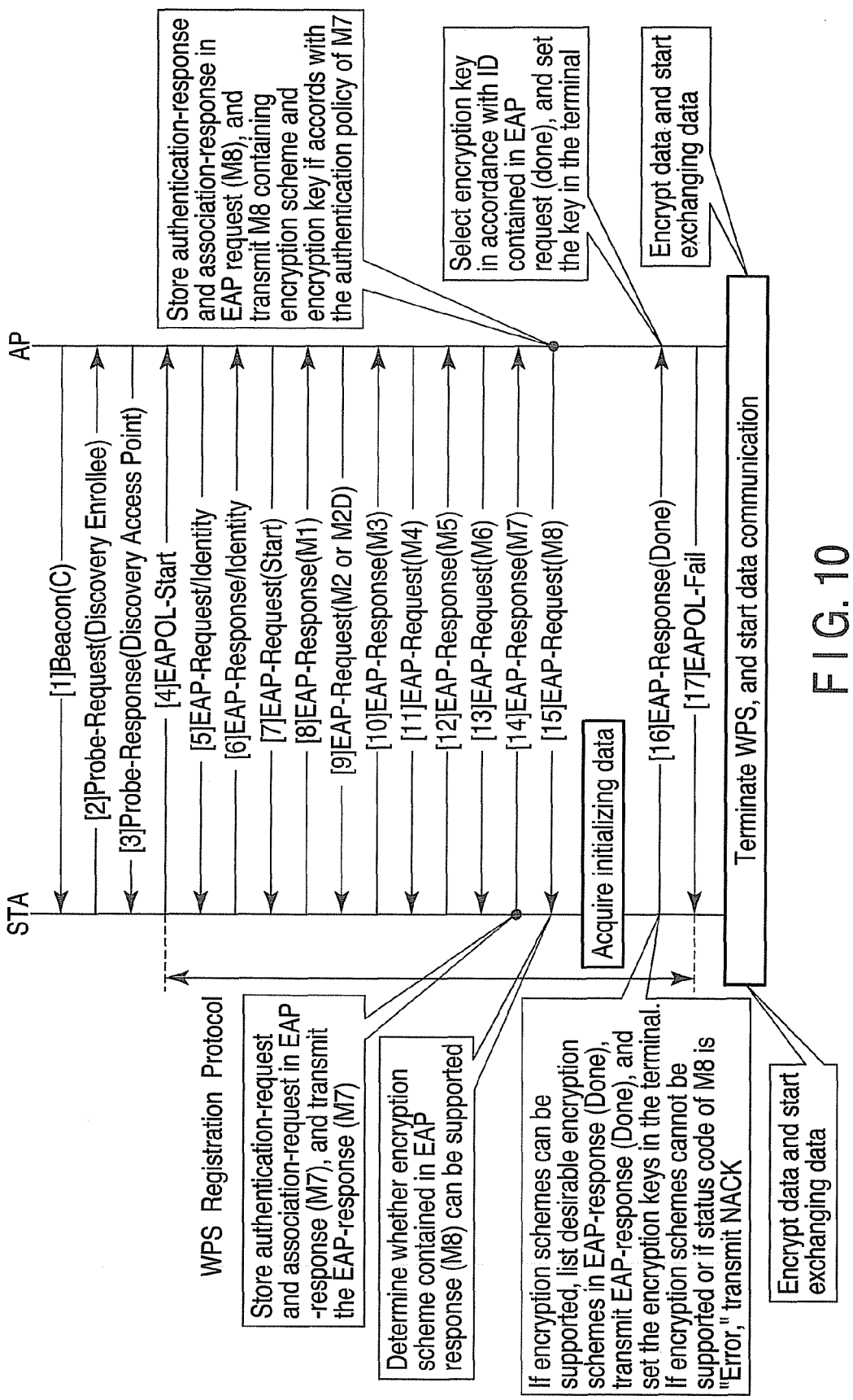
FIG. 10 shows the frame sequence of WPS according to the first embodiment.

How the access point 2 and each station 3 operate will be explained in detail, with reference to FIG. 10. FIG. 10 shows the frame sequence of WPS performed in accordance with WPS, in connection with the access point 2 and the station 3. In FIG. 10, "STA" indicates the station 2, whereas "AP" indicates the access point 2. If WPA2 or WEP is used as the encryption scheme, the frame sequence shown in FIG. 10 will be performed, too.

As shown in FIG. 10, the station 3 transmits a probe-request to the access point 2 in response to Beacon the access point 2 has transmitted. Upon receiving the probe-request, the access point 2 transmits a probe-response to the station 3 (Steps S10 to S12, Steps S30 to S32).

Next, the station 3 transmits an EAPOL-start to the station 3. On transmitting and receiving the EAPOL-start, the WPS registration protocol is started (Steps S13, Step S33). Then, the access point 2 transmits EAP-request/identify to the station 3, and the station 3 transmits EAP-response/identity to the access point 2. Further, the access point 2 transmits EAP-request (start) to the station 3. Then, the messages M1 to M6 are exchanged between the access point 2 and the station 3 (Step S14, Step S34).

After receiving the message M6, the station 3 transmits the message M7 to the access point 2 (Step S15). As described above, the station 3 has generated the message M7 containing an authentication-request and an association-request, as seen from the frame format of FIG. 4.

Upon receiving the message M7 (Step S35), the access point 2 examines the data field of the message M7, determining whether the message M7 contains the authentication-request and the association-request (Step S36). If the data field contains "0x1080" and "0x1081," the access point 2 determines that the message M7 contains the authentication-request and the association-request.

If the message M7 contains the authentication-request and the association-request (if YES in Step S37), the access point 2 refers to WPA IE contained in the association-request, determining whether it (the access point 2 itself) should communicate with the station 3 (Step S39). This process is identical to the conventional authentication process.

To authenticate the station 3 (that is, YES in Step S40), the access point 2 generates a message M8 that contains an authentication-response, an association-response, an encryption scheme, and an encryption key, as seen from the frame format of FIG. 6. Then, the access point 2 transmits the message M8 to the station 3 (Steps S43 and S43). At this point, "Successful" is stored in the status-code field of the association-response. The encryption scheme and the encryption key, both contained in the message M8, are those of the candidates the station 3 has requested, which can be supported by the access point 2.

Assume that WPA IE includes WPA-TKIP-PTK and WPA-TKIP-GTK that are the encryption schemes and encryption key the station 3 has requested, and that the access point 2 supports WPA-TKIP-PTK and WPA-TKIP-GTK. Then, the access point 2 stores, in credential of the data field, ID="0x106B," the encryption key of PTK for WPA-TKIP, ID="0x106C," the encryption key of GTK for WPA-TKIP, ID="0x106D," and RSC of GTK for WPA, thereby generating the message M8.

On the other hand, the access point 2 may not support WPA-TKIP, or any other association data may not accord with the policy of the access point 2. In this case (that is, NO in Step S40), the access point 2 cannot authenticate the station 3. Hence, the access point 2 stores a value other than "Successful" (for example, "Error") in the status code field of the association-response, and stores neither an encryption scheme nor an encryption key, thereby generating the message M8 (Step S41).

Having received the message M8 (Step S16), the station 3 determines whether the status-code field of the authentication-response is "Successful" (Step S17). If the status-code field is "Successful," the message M8 contains the encryption scheme and the encryption key. The station 3 confirms this (Step S20).

If the access point 2 supports the encryption scheme desired by station 3 (if YES in Step S21), the station 3 stores the ID of this encryption scheme in the EAP-response (done) and transmits the EAP-response (done) (Step S22). Assume that the access point 2 supports WPA-TKIP-PTK and WPA-TKIP-GTK and credential of the data field contains ID="0x106B" and ID="0x106C," as described above. Also assume that the station 3 desires to use both WPA-TKIP-PTK and WPA-TKIP-GTK. In this case, the station 3 stores ID="0x106B" and ID="0x106C" in the ID="0x1090" field of the EAP-response (done), thereby generating an EAP-response (done).

It is therefore determined that WPA-TKIP-PTK and WPA-TKIP-GTK should be employed as encryption schemes to achieve communication between the access point 2 and the station 3. At this point, the station 3 sets the encryption schemes and the encryption keys for itself. As a result, the station 3 can communicate with the access point 2, encrypting and decrypting data by using WPA-TKIP-PTK and WPA-TKIP-GTK.

On the other hand, the status code may not be "Successful" (that is, NO in Step S18). If this is the case, the station 3 determines that the access point 2 does not support the encryption scheme desired by the station 3. Therefore, the station 3 transmits NACK back to the access point 2 (Step S19). Even if the status code is "Successful," the station 3 transmits NACK back to the access point 2 unless the message M8 contains a desirable encryption scheme (Step S19).

Upon receiving the EAP-response (done), the access point 2 retrieves the field of ID="0x1090." As indicated above, the field of ID="0x1090" contains the ID of the encryption scheme desirable to the station 3. Referring to this ID, the access point 2 determines which encryption scheme should be used. Assume that the ID="0x1090" field of the EAP-response (done) contains ID="0x106B" and ID="0x106C." Then, the access point 2 determines that WPA-TKIP-PTK and WPA-TKIP-GTK should be used, and sets these encryption keys for itself. At this point, the access point 2 becomes able to communicate with the station 3, while encrypting and decrypting data by using WPA-TKIP-PTK.

The access point 2 then transmits EAPOL-Fail to the station 3 (Step S45) to terminate the WPS. The access point 2 and station 3 start data communication using WPA-TKIP-PTK and WPA-TKIP-GTK.

<Advantages>

As pointed out above, the wireless communication method according to the present embodiment can shorten the process time from the start of WPS to the start of data communication. This advantage will be explained in detail, in comparison with the conventional WPS sequence.

Figure 11:
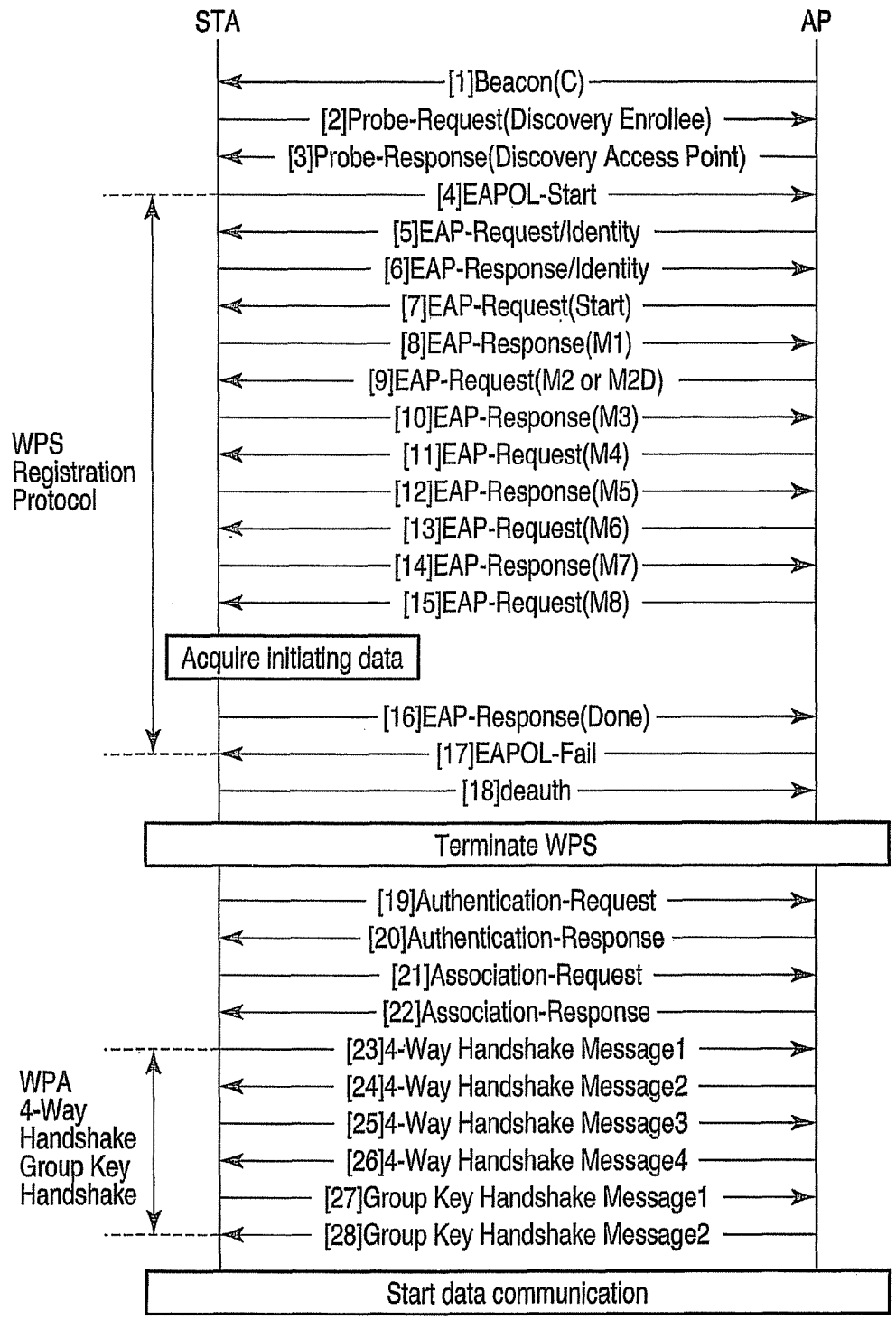
FIG. 11 shows the frame sequence of WPS.

FIG. 11 shows the conventional frame sequences of WPS and WPA. As seen from FIG. 11, the sequence of achieving wireless LAN connection by utilizing WPS includes mainly two steps. The first step is the distribution of the wireless-LAN initializing data by means of WPS (from [1] Beacon to [18] deauth, practically from [4] EAPOL-Start to [17] EAPOL-Fail). The second step is the generation and distribution of the WPA encryption key (from [19] Authentication-Request to [28] Group Key Handshake Message 2).

WPS will be first explained. The wireless-LAN initializing data distributed in accordance with WPS includes an encryption scheme, a default pass phrase, SSID, and the like (the default pass phrase is an encryption key that will be used to transmit the messages M8 et seq.). The access point 2 may distribute to the station 3 "WPA-TKIP," "ThisIsMyDefaultPassPhrase" and "WorkGroup," as the encryption scheme, default pass phrase and SSID, respectively. Then, the station 3 is connected to the access point 2 designated as "WorkGroup," by using WPA-TKIP.

The default pass phrase is generated and the encryption scheme is distributed in the period the messages M1 to M6 are transmitted in accordance with WPS. The message M8 is encrypted by using the encryption scheme and the default pass phrase, both distributed in that period. The message M8, thus encrypted, is transmitted from the access point 2 to the station 3.

When the initializing data is so distributed, WPS is completed. Then, the generation and the distribution of the WPA is started. First, an authentication/association frame, which is one of the management frames according to the IEEE 802.11 standards, accomplishes an exchange of various data items (management data items) necessary for communication, between the access point 2 and the station 3. To be more specific, the authentication frame contains the authentication scheme (shared-key scheme or open scheme), the sequence number of the authentication sequence, the success or failure of authentication (status code), the challenge text for use in the shared-key scheme, and the like. The association-request contains the ID of BSS, the transfer rate of frames that can be supported, the power for transmitting frames, and the security data (i.e., desirable encryption scheme to use, etc.), and the like. The association-response contains the success or failure of connection, the identifier allocated to the station, the transfer rate of frames that can be supported, and the data about enhanced distributed-channel access (EDCA), and the like.

Next, the 4-way handshake and key handshake of WPA (from [23] 4-way handshake message 1 to [28] group key handshake message 2 in FIG. 11) are performed, sophisticating the default pass phrase and generating an encryption key of a higher security level.

As a result, the generation and distribution of an encryption key for WPA is completed. Then, the data communication is started, utilizing the encryption scheme (i.e., WPA-TKI) and the encryption key (generated by sophisticating "ThisIsMyDefaultPassPhrase"), which have been distributed by WPA and WPA, respectively.

The conventional method using WPS is disadvantageous in that a very long time passes until the data transmission and reception are started. This is because the handshake is repeated many times to generate and distribute an encryption key. Consequently, frames are exchanged many times between the access point 2 and the station 3. This also holds true of the case where an encryption key for WPA2 or WEP is generated and distributed after performing WPS.

In the method according to this embodiment, not only the distribution of the wireless-LAN initializing data, but also the encryption key distributed in conventional WPA (i.e., encryption key actually used to transmit and receive data) is generated and distributed in accordance with the WPS protocol. The authentication/association frames are exchanged in the WPS protocol, too. Hence, when WPS is terminated, both the access point 2 and the station 3 become able to encrypt data and exchange the encrypted data. It is therefore unnecessary to perform the conventional WPA process. As a result, the number of times the frames are exchanged can be greatly reduced and the process time elapsing between the start of WPS and the start of data exchange can be shortened, as is evident from comparison between the frame sequence of FIG. 10 (this embodiment) and the frame sequence of FIG. 11 (the conventional process).

More specifically, an authentication/association-request frames are contained in the message M7 of WPS to notify the access point 2 of data about the encryption scheme desired by the station 3 to use. Further, the message M8 is transmitted to the station 3. The message M8 contains the authentication/association-response frames, the encryption scheme desired by the station 3 and supported by the access point 2, and the encryption key. The station 3 can recognize the encryption scheme that can be used to communicate with the access point 2 and can obtain this encryption scheme. Once the station 3 has obtained the encryption scheme and key, it can communicate with the access point 2. The access point 2 is notified, by EAP-response (Done) frame, of the encryption scheme the station 3 uses and uses this encryption scheme, too, to communicate with the station 3.

In not only the WPS process, but also the process of WPA, a safe wireless transmission path is formed, and data is distributed through this path. In view of this, the process of distributing both the initializing data and the encryption key in WPS can be said to avoid wasteful frame exchanges.

Second Embodiment

A wireless communication method according to a second embodiment of this invention will be described. This embodiment differs from the first embodiment in that no authentication/association frames are transmitted. The wireless LAN system 1, access point 2 and stations 3 according to this embodiment are identical to those described with reference to FIG. 1 and FIG. 2. Only the points differing from the first embodiment will be described below.

<Operation of the Station 3>

How each station 3 according to this embodiment operates will be explained with reference to FIG. 12. FIG. 12 is a flowchart explaining how the station 3 operates in accordance with WPS.

As FIG. 12 shows, the station 3 performs Steps S10 to S13 in the same way as in the first embodiment. The station 3 then exchanges the messages M1 to M7 defined by the conventional WPS, with the access point 2 (Step S50). The message M7 has been generated by deleting the authentication-request and association-request from the data field shown in FIG. 4. After receiving the message M8 (Step S16), the station 3 performs Steps S20 to S24 in the same way as in the first embodiment. Note that the station 3 does not perform Step 17 or Step 18.

<Operation of the Access Point 2>

Figure 13:
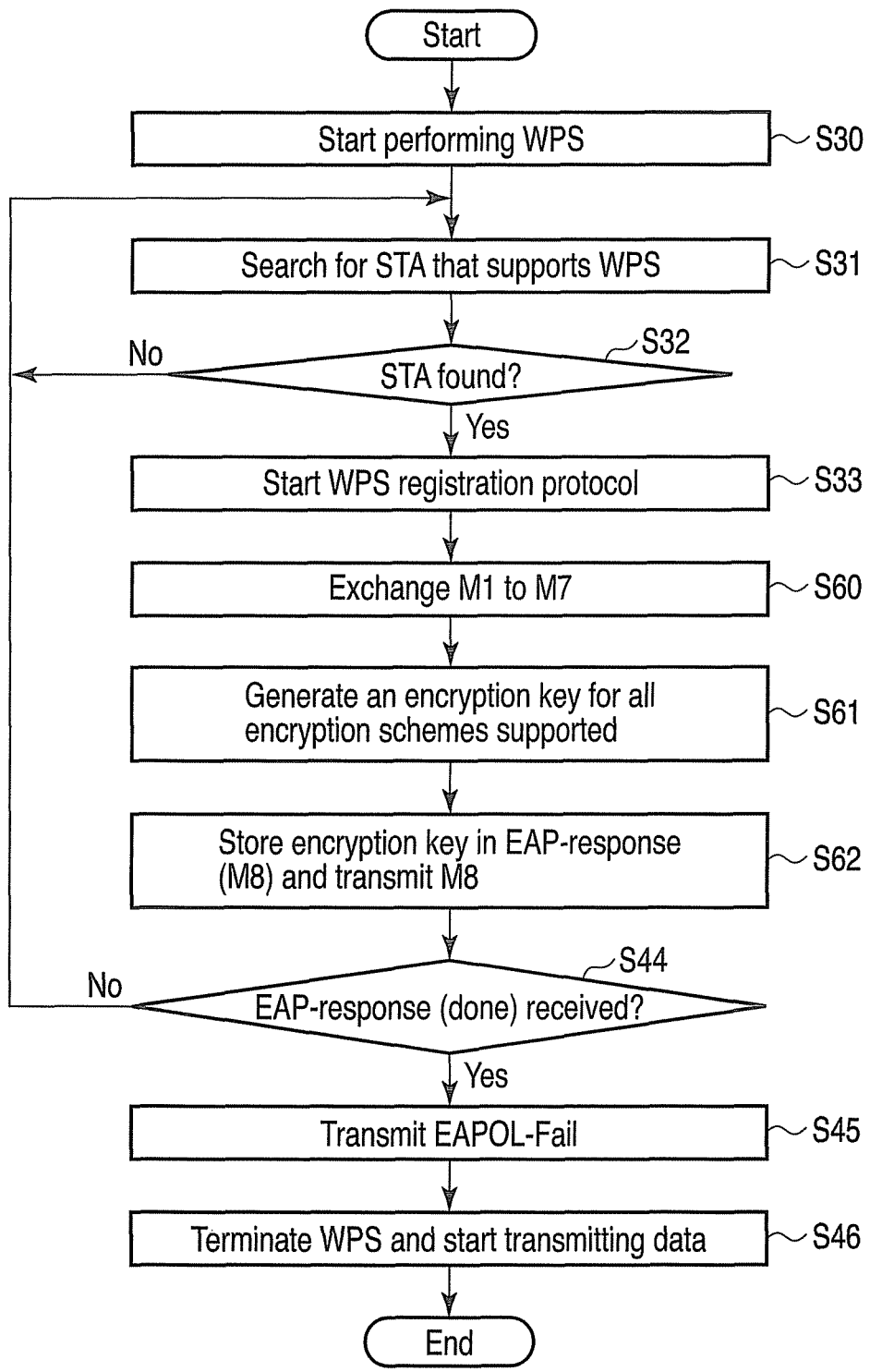

How the access point 2 operates in this embodiment will be explained below, with reference to FIG. 13. FIG. 13 is a flowchart explaining how the access point 2 operates in accordance with WPS.

Figure 14:
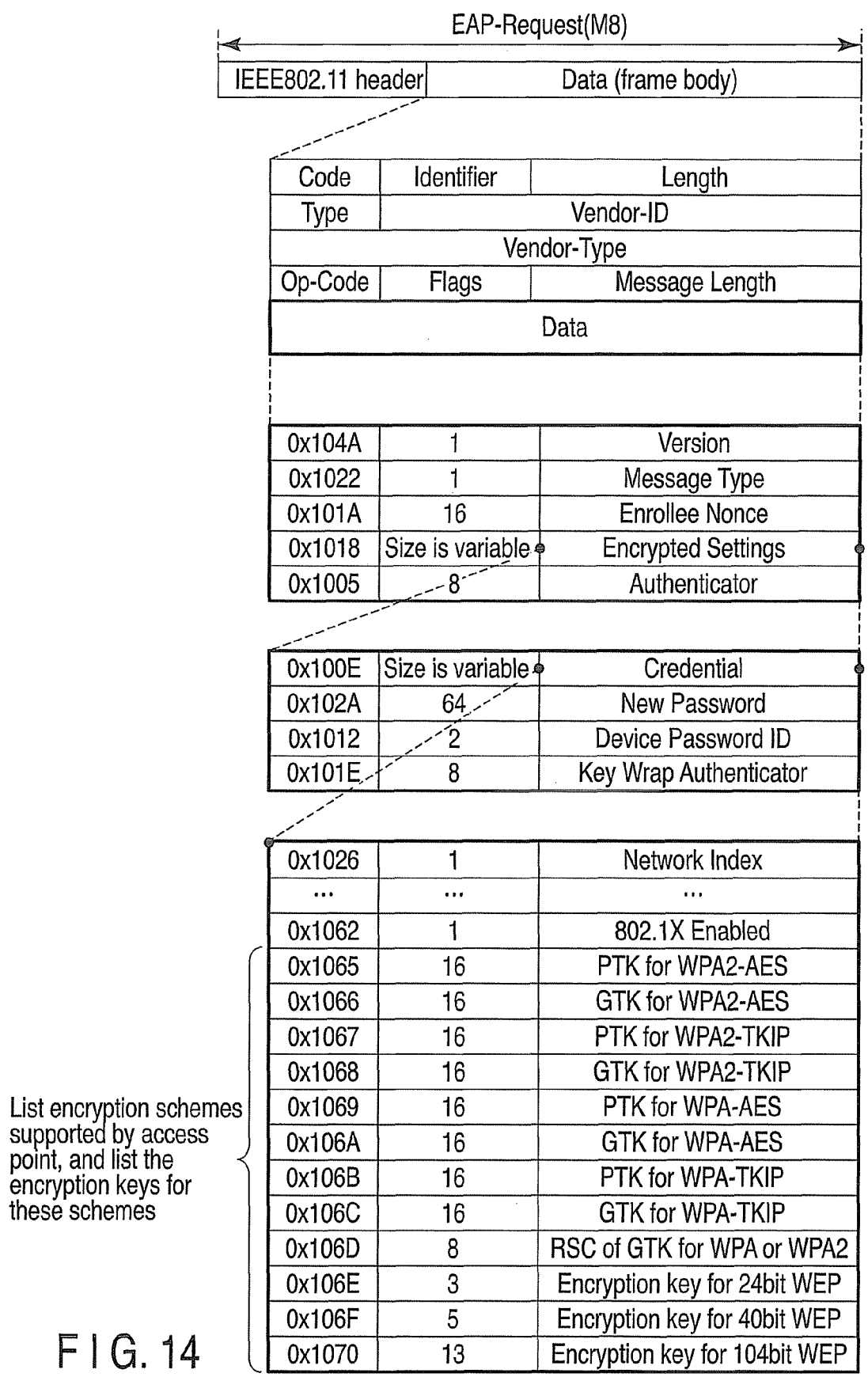
FIG. 14 is a frame format of the message M8 used in WPS according to the second embodiment.

As FIG. 13 shows, the access point 2 first performs Steps S30 to S33 in the same way as in the first embodiment and then exchanges the messages M1 to M7 defined by the conventional WPS, with the station 3 (Step S60). Upon receiving the message M7, the access point 2 generates an encryption key for all encryption schemes it can support (Step S61). The access point 2 then stores all encryption schemes and the encryption key for the respective schemes in the message M8, and transmits the message M8 to the station 3 (Step S62). The message M8 has such a frame format as shown in FIG. 14. As FIG. 14 shows, the message M8 according to this embodiment does not have an authentication-response and an association-response in the data field, and contains all encryption schemes the access point 2 supports in credential. The access point 2 then performs Steps S44 to S46 in the same manner as in the first embodiment.

<Specific Example of WPS>

How the access point 2 and the station 3 operate will be explained in detail, with reference to FIG. 15.

Figure 15:
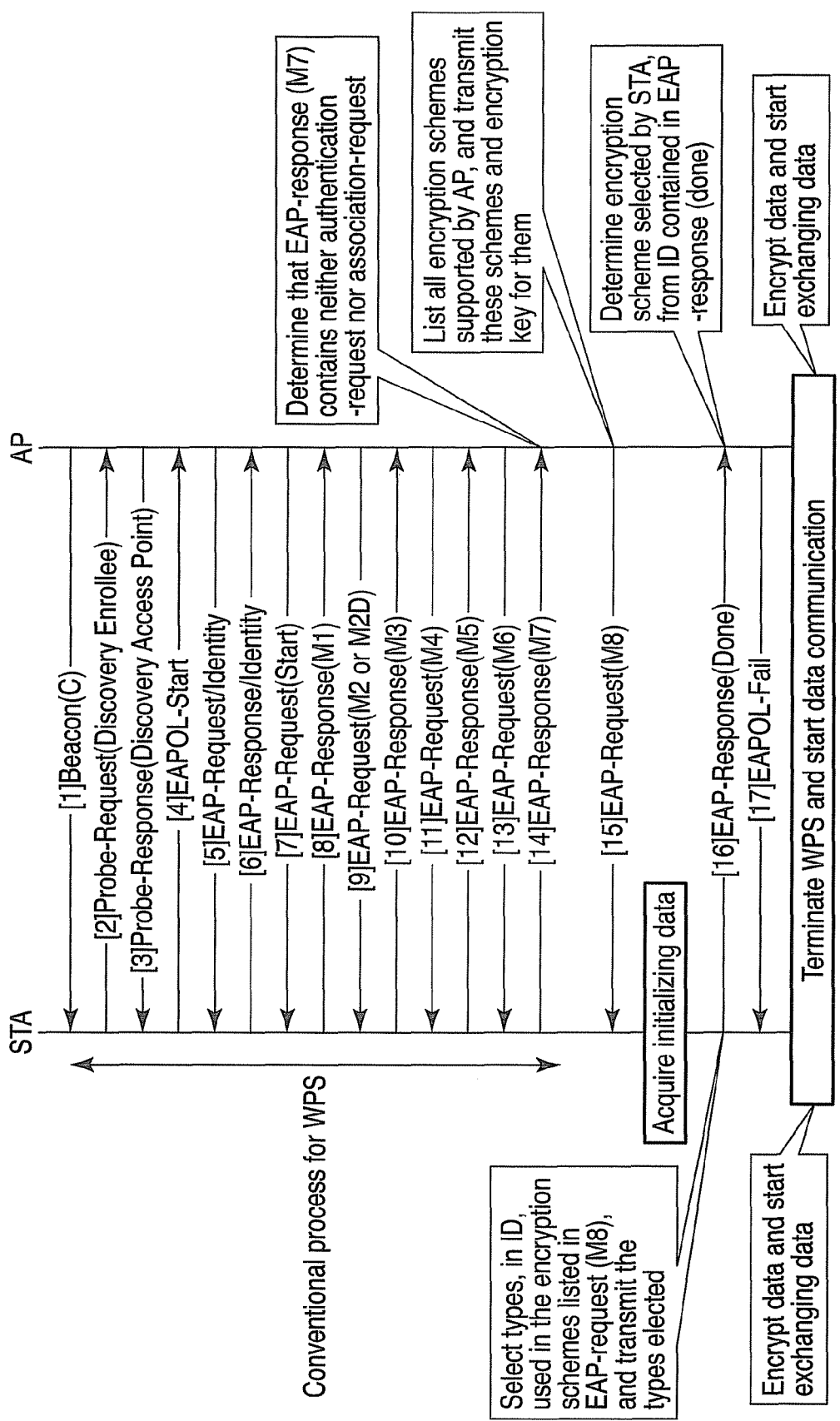
FIG. 15 shows the frame sequence of WPS according to the second embodiment.

FIG. 15 shows the frame sequence performed between the access point 2 and the station 3 in WPS, by using WPA. In FIG. 15, "STA" indicates the station 2, whereas "AP" indicates the access point 2. If WPA2 or WEP is used as the encryption scheme, the frame sequence shown in FIG. 15 will be performed, too. Only the points differing from the first embodiment will be described below.

As seen from in FIG. 15, processes similar to those of the conventional WPS are performed until the message M7 is transmitted from the station 3 to the access point 2. When the access point 2 determines that the message M7 contains neither the authentication-request nor the association-request, the access point 2 generates an encryption key for all encryption schemes it supports (Step S61). The access point 2 then generates a message M8 that contains the IDs of all encryption schemes it supports and the encryption keys for these schemes, and transmits the message M8 to the station 3 (Step S62).

Assume that the access point 2 supports WPA2-AES, WPA2-TKIP, WPA-AES and WPA-TKIP. Then, credential of the message M8 contains "0x1065" to "0x106C" as the ID of the encryption schemes.

Having received the message M8 (Step S16), the station 3 determines whether a desirable encryption scheme is contained in the message M8 (Step S20). If the desirable encryption schemes is contained in the message M8 (if YES in Step S21), the station 3 stores the ID of this scheme in the EAP-response (done) and transmits the EAP-response (done) to the access point 2 (Step S22). This process is just the same as in Step 22 in the first embodiment. At this point, the access point 2 and the station 3 become able to communicate, by virtue of the encryption scheme stored in the EAP-response (done). The desirable encryption schemes may not be contained in message M8 (that is, NO in Step S21). If this is the case, the station 3 transmits NACK back to the access point 2.

<Advantages>

As described above, the wireless communication method according to this embodiment can not only achieve the advantages of the first embodiment, but also simplify the process of the WPS registration protocol.

As already explained in conjunction with the first embodiment, the access point 2 and the station 3 exchange management data items using authentication-request/response and association-request/response. Nonetheless, similar exchange of data is achieved as the frames of probe-request and probe-response are exchanged. The frames of probe-request/response are also management frames that accord with the IEEE 802.11 standards. That is, the management data has already been exchanged before the WPS registration protocol is started.

Hence, the access point 2 and the station 3 exchange neither the authentication-request/response nor the association-request/response in the wireless communication method according to the present embodiment. The messages M7 and M8 are therefore simpler in configuration and the process of the WPS registration protocol can be simpler than in the first embodiment. However, unlike in the first embodiment, the station 3 can hardly notify the access point 2 of the desirable encryption scheme using the WPA IE in the association-request. Therefore, the access point 2 notifies the station 3 of all encryption schemes it supports, by transmitting the message M8 to the station 3.

As has been described, the security type (encryption scheme), including at least wireless LAN security standards, such as WPA, WPA2 or WEP, and the encryption key for this security type are distributed in the WPS registration protocol in the wireless communication methods according the first and second embodiments of this invention. Hence, no WPA processes need be performed after WPS has been completed. Encrypted data can be transmitted at once. Note that the encryption key is generated as the WPS registration protocol is performed, too. Moreover, the management data may be distributed as an authentication/association frame in the WPS registration protocol, or as a probe-request/response frame before the WPS registration protocol.

The first and second embodiments may be combined. In this case, each station 3 operates as explained with reference to FIG. 3 or FIG. 12. On the other hand, the access point 2 performs Step S39 et seq. shown in FIG. 9 if the message M7 contains an authentication-request and an association-request, and performs Steps S61 et seq. shown in FIG. 13 if the message M7 contains neither an authentication-request nor an association-request.

In the embodiments described above, the EAP-request/response, authentication-request/response, association-request/response, and probe-request/response in conventional WPS have the configurations that accord with the standards disclosed in Wi-Fi Alliance, "Wi-Fi Protected Setup Specification," Version 1.0h, December 2006. The configurations of EAPOL-Start, EAP-Request/Identify, EAPOL-Fail and Beacon, which have not been explained in detail, also accord with the standards disclosed in Wi-Fi Alliance, "Wi-Fi Protected Setup Specification," Version 1.0h, December 2006.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication method comprising:
receiving a first frame requesting to start a registration protocol in Wi-Fi protected setup (WPS) of wireless LAN security standards;
transmitting, after receiving the first frame, a second frame containing security types and encryption keys for the respective security types, the security types including at least one of Wi-Fi protected access (WPA), WPA2 and WEP; and
transmitting a third frame, after transmitting the second frame, the third frame instructing to terminate WPS,
wherein the second frame contains management data and the management data includes an authentication-response and an association-response according to IEEE 802.11 standards,
the method further comprising:
receiving a fourth frame containing an authentication-request and an association-request according to the IEEE 802.11 standards after receiving the first frame and before transmitting the second frame,
wherein the association-request includes a WPA information element containing data showing that WPA is supported and data showing a security type desirable to use, and
the second frame contains the security type contained in the WPA information element.

2. The method according to claim 1, further comprising:
receiving, after transmitting the second frame, a fifth frame containing data representing a security type desirable to use; and
determining, after transmitting the fifth frame, that a security type to be used in communication performed after the termination of WPS is the security type contained in the fifth frame.

3. The method according to claim 1, further comprising:
receiving, after transmitting the third frame, encrypting and transmitting data and receiving and decrypting data, by using the encryption key contained in the second frame, without performing the protocol of WPA or the protocol of WPA2.

4. A wireless communication method comprising:
transmitting a first frame requesting to start a registration protocol in Wi-Fi protected setup (WPS) of wireless LAN security standards;
receiving, after receiving the first frame, a second frame containing security types and encryption keys for the respective security types, the security types including at least of one of Wi-Fi protected access (WPA), WPA2 and WEP; and
receiving a third frame, after receiving the second frame, the third frame instructing to terminate WPS,
wherein the second frame contains management data and the management data includes an authentication-response and an association-response according to IEEE 802.11 standards,
the method further comprising:
transmitting a fourth frame containing an authentication-request and an association-request according to the IEEE 802.11 standards after transmitting the first frame and before receiving the second frame,
wherein the association-request includes a WPA information element containing data showing that WPA is supported and data showing a security type desirable to use, and
the second frame contains the security type contained in the WPA information element.

5. The method according to claim 4, further comprising:
transmitting, after receiving the second frame, a fifth frame containing data representing a security type desirable to use; and
wherein the security type contained in the fifth frame is used in communication performed after the termination of WPS.

6. The method according to claim 4, further comprising:
receiving, after receiving the third frame, encrypting and transmitting data and receiving and decrypting data, by using the encryption key contained in the second frame, without performing the protocol of WPA or the protocol of WPA2.

* * * * *